United States Patent [19]
Woontner

[11] 3,891,886
[45] June 24, 1975

[54] CATHODE RAY TUBE HAVING A LUMINESCENT SCREEN INCLUDING A TWO COMPONENT WHITE-EMITTING PHOSPHORIC MIXTURE

[75] Inventor: Leo Woontner, Marion, Ind.
[73] Assignee: RCA Corporation, New York, N.Y.
[22] Filed: Mar. 10, 1971
[21] Appl. No.: 122,720

Related U.S. Application Data

[63] Continuation-in-part of Ser. No. 811,532, March 28, 1969.

[52] U.S. Cl............................. 313/467; 252/301.6 S
[51] Int. Cl........................ H01j 29/20; C09k 1/04
[58] Field of Search............ 313/92 PH; 252/301.6 S

[56] References Cited
UNITED STATES PATENTS
2,461,726  2/1949  Ellefson...................... 252/301.6 S
3,595,804  7/1971  Martin......................... 252/301.6 S

*Primary Examiner*—Robert Segal
*Attorney, Agent, or Firm*—G. H. Bruestle; L. Greenspan

[57] ABSTRACT

A novel cathode ray tube such as a picture tube for a black-and-white television receiver. The tube has a luminescent screen including a white-emitting mixture consisting essentially of (a) a blue-emitting silver activated zinc sulfide phosphor and (b) a yellow-emitting copper-and-aluminum activated zinc cadmium sulfide phosphor having a copper content between 0.001 and 0.009 weight percent and an aluminum content not less than the copper content.

5 Claims, 1 Drawing Figure

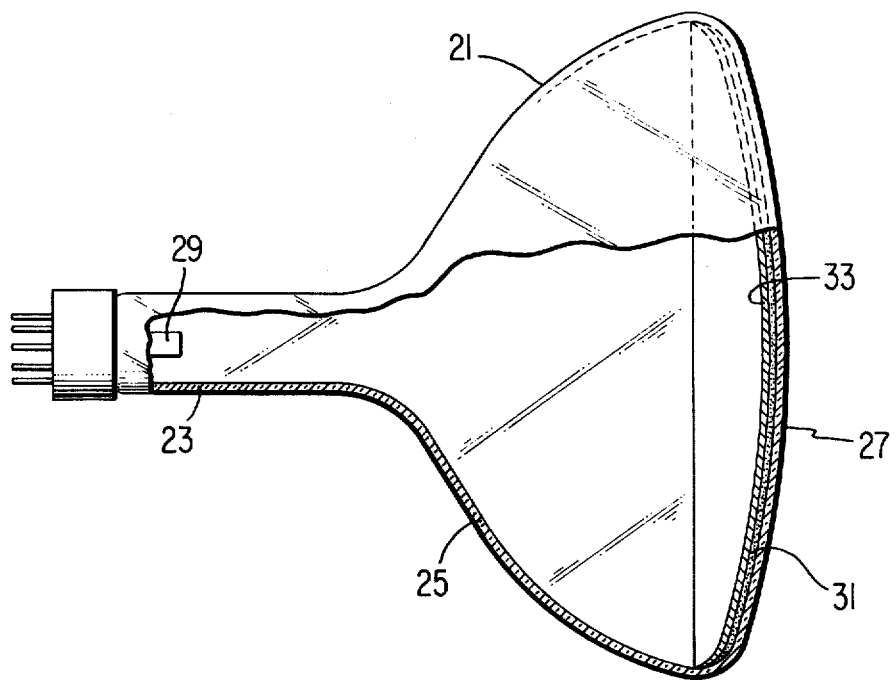

CATHODE RAY TUBE HAVING A LUMINESCENT SCREEN INCLUDING A TWO COMPONENT WHITE-EMITTING PHOSPHORIC MIXTURE

CROSS REFERENCES TO RELATED APPLICATIONS

This is a continuation-in-part of patent application Ser. No. 811,532 filed Mar. 28, 1969, by Leo Woontner and assigned to the same assignee as this application.

BACKGROUND OF THE INVENTION

This invention relates to a novel cathode ray tube having a luminescent screen including a two component whiteemitting blend of blue-emitting and yellow-emitting phosphors.

A picture tube for a black-and-white television receiver is usually a cathode ray tube having a white-emitting luminescent screen comprised of a two component blend of blue-emitting and yellow-emitting phosphors. This type of screen is referred to in the art as a P4 screen. One blend that has been widely used commercially for many years is a mixture of blue-emitting silver activated zinc sulfide and yellow-emitting silver activated zinc cadmium sulfide.

SUMMARY

The novel cathode ray tube comprises a luminescent screen including a white-emitting mixture consisting essentially of a blue-emitting silver activated zinc sulfide phosphor and a yellow-emitting copper-and-aluminum activated zinc cadmium sulfide phosphor. The mixture is preferably about 54 to 58 weight percent of the blue-emitting phosphor and 46 to 42 weight percent of the yellow-emitting phosphor. The yellow-emitting phosphor has a weight ratio of CdS/ZnS between 12/88 and 17/83, between 0.001 and 0.009 weight percent copper activator and an aluminum content that is not less than the copper content.

The screen of the novel tube exhibits significant improvements over previous screens of this type in contamination resistance, processing stability, body color, light output and materials costs. Thus, the performance of the novel tube is improved and the cost of manufacture reduced over previous tubes.

BRIEF DESCRIPTION OF THE DRAWING

The sole FIGURE is a longitudinal, partially-sectional view of the novel cathode ray tube.

DESCRIPTION OF THE PREFERRED EMBODIMENTS

The sole FIGURE, illustrating the novel cathode ray tube, includes an evacuated glass envelope 21 including a neck portion 23, a funnel portion 25 and a faceplate 27. An electron gun 29 is sealed in the neck portion 23 at one end of the envelope 21 opposite the faceplate 27. On the inner surface of the faceplate 27 is a phosphor layer 31, which in turn is overlaid by a reflecting layer of aluminum metal 33, which together comprise the luminescent screen of the tube. Inasmuch as the invention is concerned primarily with the luminescent screen, the electron-emitting components and other parts normally associated with the neck and funnel portions 23 and 25 are omitted or shown schematically. In the operation of the tube, which is conventional, an electron beam from the gun 29 is caused to scan the phosphor layer 31 so as to produce a luminescent image thereon which may be viewed through the faceplate 27.

In a first example, the phosphor layer 31 is comprised of a two component mixture containing about 56 weight percent of a blue-emitting silver activated zinc sulfide phosphor containing about 0.020 weight percent silver activator, and about 44 weight percent of a yellow-emitting copper-and-aluminum activated zinc cadmium sulfide phosphor containing about 0.007 weight percent of copper activator, 0.007 weight percent of aluminum coactivator, and having a CdS/ZnS weight ratio of about 15/85. This screen may be described by the following notation: 56 percent ZnS:Ag(0.020) and 44 percent 0.85 ZnS.0.15CdS:Cu(-0.007,Al(0.007).

In a second example, the phosphor layer 31 is comprised of a two-component mixture containing about 56 weight percent of a blue-emitting silver-activated zinc sulfide phosphor containing about 0.020 weight percent silver activator and about 44 weight percent of a yellow-emitting copper-and-aluminum-activated zinc cadmium sulfide phosphor containing about 0.003 weight percent of copper activator, 0.005 weight percent of aluminum coactivator, and having a CdS/ZnS weight ratio of about 15/85. This screen may be described by the following notation: 56 percent ZnS:Ag(0.020) and 44 percent 0.85 ZnS.0.15CdS:Cu(-0.003),Al(0.005).

The blue-emitting phosphor may be any of the known blue-emitting silver activated zinc sulfide phosphors. The preferred blue-emitting phosphors contain 0.010 to 0.030 weight percent silver activator. The yellow-emitting phosphor is selected from a particular compositional range which is designated broadly as

$$m\text{ZnS}.n\text{CdS}:\text{Cu}(o),\text{Al}(p)$$

wherein:

$m$ is between 0.83 and 0.88 parts by weight,
$n$ is between 0.12 and 0.17 parts by weight,
$o$ is between 0.001 and 0.009 weight percent,
$p$ is not less than $o$, and
$m + n = 1.00$ Since the filing of the parent patent application, it has been found that the range of copper content can be extended from 0.005 down to 0.001 weight percent. It has also been found that the aluminum content should be equal to or greater than, but not less than, the copper content for any particular phosphor. This is illustrated in the second example above. It is preferred that the ratio of copper content to aluminum content ($o/p$) be about 3 to 5. Inasmuch as the efficiencies of phosphors containing copper in the range of 0.003 to 0.006 are essentially constant, the lower activator contents are preferred. Phosphors with lower activator contents have a greater capacity to accommodate chance incorporation of impurity copper which may be present during manufacturing.

The phosphors are particulate with the individual particles in the size range of about 3 to 15 microns. The particles may have a thin coating thereon of a light transparent material, such as silica or zinc silicate, to aid in fabricating the screen.

The novel tube may be a picture tube for television or may be a display tube for another electronic system. In either case, the screen is a continuous layer of the phosphor blend. In other embodiments the screen may comprise discrete white-emitting areas alone or in combination with discrete areas having other emission characteristics. In still other embodiments, the novel tube may be used for other purposes than display of information.

The novel screen may be fabricated by any screen-making process. A continuous phosphor layer, such as shown in the sole FIGURE, is preferably made by settling through a liquid medium. In one preferred process, the component phosphors are mixed together in an aqueous medium. The mixture is poured into an open envelope of the cathode ray tube and the phosphor mixture is permitted to settle upon the inner surface of the faceplate of the envelope. When the desired thickness of the layer is reached, the remaining liquid is carefully removed so as not to disturb the settled screen. The screen is then dried, coated with an organic film, and aluminum metal is evaporated upon the film. After aluminizing, the screen is baked in air at about 440°C to remove volatile and organic matter. Then the tube fabrication is completed in the usual way.

The phosphor layer consists essentially of a mixture of 54 to 58 weight percent of the blue-emitting phosphor and 46 to 42 weight percent of the yellow-emitting phosphor. The proportions may be chosen to provide the desired color or shade of white emission. Obviously higher proportions of blue-emitting phosphor provide a bluer white and higher proportions of yellow-emitting phosphor provide a yellower white. Beyond the recited range, it is believed that the emission color of the screen may have too great a tint of blue or yellow as the case may be to be considered acceptable as a white-emitting screen.

The principal innovation of the novel tube is the use of a two component phosphor blend wherein one component is a yellow-emitting phosphor consisting essentially of a copper-and-aluminum activated zinc cadmium sulfide phosphor. The composition of the yellow-emitting phosphor as compared to a presently used silver activated zinc cadmium sulfide phosphor for a P4 screen can be summarized as follows:

| Yellow-Emitting ZnCdS Phosphor | Weight % ZnS | Weight % CdS | Weight % Activator | Firing Temp. |
| --- | --- | --- | --- | --- |
| Copper-Aluminum Activated | 83–88 | 17–12 | 0.001–0.009 | 1200 ± 100°C |
| Silver Activated | 45–55 | 55–45 | 0.010–0.030 | 900 ± 100°C |

Some of the advantages of the novel tube over a similar tube employing the above-described silver activated yellow-emitting phosphor are greater resistance to contamination, greater processing stability, whiter body color, greater light output and lower material cost. These advantages may be summarized as follows:

Contamination Resistance

Yellow-emitting phosphors have been developed in the past especially to provide for improved resistance to copper contamination but always at some sacrifice in luminescent efficiency. The copper-and-aluminum activated yellow-emitting phosphor has superior contamination resistance (sufficiently so as to warrant being described as contamination-proof). This improvement is achieved with no sacrifice in efficiency.

Processing Stability

Sulfide-host phosphors are known to undergo degradation in luminescent efficiency during tube manufacture due to interactions with the processing environment. Controlled tests have demonstrated that the copper-and-aluminum yellow-emitting phosphor provides for a greater degree of stability towards efficiency losses due to handling. This is demonstrated by the following data representing typical efficiencies of white-emitting P4 phosphor blends prepared with a common blue-emitting phosphor and various zinc cadmium sulfide yellow-emitting phosphors as indicated:

| Yellow-Emitting Phosphor in P4 Blend | Initial Efficiency of Yellow-Emitting Phosphor | Relative Efficiency of P4 Screen |
| --- | --- | --- |
| Silver Activated-High Efficiency | 112% | 114% |
| Silver Activated Contamination Resistant | 100 | 100 |
| Copper-and-Aluminum | 114 | 125 |

Body Color:

Phosphors having a host material of zinc cadmium sulfide solid solutions exhibit a yellow to orange body color that is generally proportional in color to the cadmium content. This body color produces an "off-color" in the white-emitting blend which detracts from what is considered to be an aesthetically acceptable screen appearance. In addition, the yellow body color, acting as an optical filter for blue light, effectively decreases the luminance obtainable from the blue-emitting component of the blend. The 30% reduction in cadmium content for the copper-and-aluminum activated yellow-emitting phosphor results in a distinctly lighter body color than that exhibited by the silver activated yellow-emitting phosphor. The lighter body color contributes to both an enhanced appearance of the unexcited screen and an increased luminescent efficiency.

Light Output:

P4 phosphor blends which include a copper-and-aluminum activated yellow-emitting phosphor have demonstrated improved light output over comparable P4 screens prepared with either contamination resistant or high efficiency silver-activated yellow-emitting phosphors. The lighter body color and the improved processing stability combine to yield P4 screens of significantly greater brightness as shown in the following comparison of typical brightnesses:

| | | Silver Activated High Efficiency | Silver Activated Contam'n Resistant | Copper-and-Aluminum Activated |
| --- | --- | --- | --- | --- |
| Light Output (Ft. Lamb.) | Test A | 229 | 201 | 252 |
| | Test B | 204 | — | 224 |
| | Test C | 196 | — | 216 |

Material Cost:

The major materials cost in zinc cadmium sulfide phosphors is associated with the cadmium content. The current cost of the raw cadmium oxide used in phosphor manufacture is nearly triple that of the zinc oxide. The reduced cadmium requirement for copper-and-aluminum yellow-emitting phosphors results in about a 20% reduction in the cost of the yellow-emitting phosphor component. In addition, because of the higher effective efficiency of the copper-and-aluminum yellow-emitting phosphor, the amount of yellow-emitting phosphor required in combination with the blue-emitting phosphor to produce a white-emitting screen is reduced by about 5% (from about 49 to about 44%). The resultant savings in the finished blend of yellow- and blue-emitting phosphors amounts to about 12.4% over current costs for blends prepared with silver activated yellow-emitting phosphors.

I claim:

1. A cathode-ray tube comprising an evacuated envelope, a luminescent screen within said envelope and electron-producing means for exciting said screen to luminescence within said envelope, said luminescent screen including at least one white-emitting area consisting essentially of a mixture of:
   a. 54 to 58 weight percent of a blue-emitting silver-activated zinc sulfide phosphor containing between 0.010 and 0.030 weight percent silver and
   b. 46 to 42 weight percent of a yellow-emitting copper-and-aluminum-activated zinc cadmium sulfide phosphor having the composition $m$ZnS.$n$CdS:Cu($o$),Al($p$) wherein: $m$ is between 0.83 and 0.88 parts by weight, $n$ is between 0.12 and 0.17 parts by weight, $m$ plus $n$ equals 1.0, $o$ is between 0.001 and 0.009 weight percent and $p$ is not less than $o$.

2. The tube defined in claim 1 wherein the composition of said blue-emitting phosphor is ZnS:Ag(0.010 to 0.030 weight percent).

3. The tube defined in claim 2 wherein
   a. the composition of said blue-emitting phosphor is ZnS:Ag (0.020 weight percent) and
   b. the composition of said yellow-emitting phosphor is 0.85ZnS.0.15 CdS:Cu (0.007 weight percent), Al (0.007 weight percent).

4. The tube defined in claim 1 wherein the ratio of $o/p$ is about 3/5.

5. The tube defined in claim 4 wherein the composition of said yellow-emitting phosphor is 0.85ZnS.0.15CdS:Cu (0.003 weight percent), Al (0.005 weight percent).

* * * * *